United States Patent [19]

Weaver et al.

[11] 4,049,643
[45] Sept. 20, 1977

[54] PHENYLAZO COMPOUNDS FROM CYCLOHEXYLAMINOACYLANILIDES

[75] Inventors: Max A. Weaver; James M. Straley; William H. Moore, all of Kingsport, Tenn.

[73] Assignee: Eastman Kodak Company, Rochester, N.Y.

[21] Appl. No.: 660,287

[22] Filed: Feb. 23, 1976

Related U.S. Application Data

[63] Continuation of Ser. No. 514,964, Oct. 15, 1974, abandoned, and a continuation-in-part of Ser. No. 833,743, June 16, 1969, abandoned.

[51] Int. Cl.$^2$ .................... C09B 29/08; C09B 29/26; D06P 1/04; D06P 3/52
[52] U.S. Cl. .............................. 260/207.1; 260/152; 260/158; 260/187; 260/207; 260/465 D; 260/465 E; 260/562 R
[58] Field of Search ............................. 260/207, 207.1

[56] References Cited

U.S. PATENT DOCUMENTS

| | | | |
|---|---|---|---|
| 2,092,398 | 9/1937 | Krzivalla et al. | 260/205 |
| 2,107,898 | 2/1938 | McNally et al. | 260/205 X |
| 2,234,704 | 3/1941 | McNally et al. | 260/205 |
| 2,241,247 | 5/1941 | Dickey | 260/206 |
| 2,286,795 | 6/1941 | Dickey et al. | 260/205 |
| 2,289,349 | 7/1942 | Dickey et al. | 260/205 |
| 2,289,376 | 7/1942 | McNally et al. | 260/205 |
| 2,346,013 | 4/1944 | Dickey | 260/205 |

Primary Examiner—Floyd D. Higel
Attorney, Agent, or Firm—Donald W. Spurrell; Daniel B. Reece, III

[57] ABSTRACT

Substituted phenylazo compounds having a cyclohexylaminoacylanilide coupling component are useful as dyes for polyester textile materials on which the compounds exhibit improved dyeability, fastness to light, resistance to sublimation and improved brightness.

8 Claims, No Drawings

PHENYLAZO COMPOUNDS FROM CYCLOHEXYLAMINOACYLANILIDES

This is a continuation of Ser. No. 514,964, filed Oct. 15, 1974, now abandoned, which is a continuation-in-part application of Ser. No. 833,743 filed June 16, 1969, now abandoned.

This invention relates to certain novel waterinsoluble, azo compounds and to polyester textile materials dyed therewith.

The novel azo compounds of the invention have the general formula:

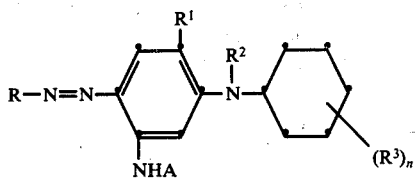

wherein
R is a phenyl radical, a 2-thiazolyl radical, a 2-benzothiazolyl radical, or a 2-thienyl radical;
A is an acyl radical;
$R^1$ is hydrogen, lower alkyl, or lower alkoxy;
$R^2$ is hydrogen or a lower alkyl radical;
$R^3$ is lower alkyl; and
n is 0, 1, 2, or 3.

The azo compounds of the invention produce bright orange to turquoise shades when applied to polyester fibers, yarns and fabrics according to conventional dyeing procedures. The novel compounds possess improved dyeability characteristics including build, exhaustion, crock fastness and leveling, improved dye yield and purity by virtue of coupler structure, improved brightness, improved fastness to light and resistance or fastness to sublimation. The description of the novel azo compounds as "water-insoluble" means that the azo compounds are relatively and substantially water-insoluble because the compounds are free of water solubilizing groups such as sulfo and salts thereof.

The diazo component represented by R can be unsubstituted or, preferably, substituted with, for example, lower alkyl, lower alkoxy, aryl, nitro, halogen, lower alkylthio, lower alkoxycarbonylalkylthio, cyclohexylthio, arylthio, arylazo, formyl, lower alkanoyl, lower alkoxycarbonyl, aroyl, lower alkanoylamino, aroylamino, cyano, lower alkylsulfonyl, arylsulfonyl, lower alkylsulfonamido, trifluoromethyl, sulfamoyl, lower alkylsulfamoyl, carbamoyl, lower alkylcarbamoyl, thiocyanato, etc. The alkanoyl groups can be substituted with substituents such as halogen, phenyl, cyano, lower alkoxy, lower alkylthio, lower alkylsulfonyl, etc. The alkylsulfonyl groups can also be substituted, for example, with cyano, hydroxy, halogen, and the like. The alkoxycarbonyl groups can be substituted, for example, with hydroxy or cyano. As used herein to describe a group containing an alkyl moiety, "lower" designates a carbon content from 1 to about 4 carbon atoms. Examples of the alkyl and alkoxy groups which can be present on the diazo components include methyl, ethyl, isopropyl, propyl, butyl, methoxy, ethoxy, propoxy, butoxy, etc. Chlorine and bromine are typical halogen atoms. Methylsulfonyl, ethylsulfonyl, propylsulfonyl, butylsulfonyl, 2-cyanoethylsulfonyl, 2-hydroxyethylsulfonyl, acetyl, propionyl, butyryl, isobutyryl, 3-chloropropionyl, cyanoacetyl, methoxycarbonyl, ethoxycarbonyl, propoxycarbonyl, 2-cyanoethoxycarbonyl, 2-hydroxyethoxycarbonyl, etc. are examples of the alkylsulfonyl, alkanoyl, and alkoxycarbonyl groups which can be present on the groups represented by R.

Acetamido, pripionamido, methylsulfonamido, ethylsulfonamido, and butylsulfonamido are typical alkanoylamino and alkylsulfonamido substituents which can be present on the diazo component. Dimethylsulfamoyl, ethylsulfamoyl, butylsulfamoyl, diethylcarbamoyl, propylcarbamoyl, dibutylcarbamoyl are examples of the alkylsulfamoyl and alkylcarbamoyl groups. The aryl groups which can be present on the diazo component including the aryl moiety of the arylthio, aralkylthio, aroyl and arylsulfonyl groups are preferably monocyclic, carbocyclic aryl such as phenyl and phenyl substituted, for example, with lower alkyl, e.g. tolyl; lower alkoxy, e.g. anisyl; halogen, e.g. chlorophenyl, bromophenyl; etc. Benzoyl, p-toloyl, p-chlorobenzoyl, p-nitrobenzoyl, p-ethoxyphenylthio, p-chlorobenzylthio, benzamido, p-tolylamino, p-tolylsulfonyl, p-ethoxyphenylsulfonyl, etc. are examples of the aryl-containing groups which can be present on the groups represented by R.

Illustrative of the phenyl radicals which R can represent are 2-chloro-4-nitrophenyl, 4-nitrophenyl, 2-chloro-4-methylsulfonylphenyl, 2,4-di(methylsulfonyl)phenyl, 2-methylsulfonyl-4-nitrophenyl, 2-nitro-4-methylsulfonylphenyl, 2-acetyl-4-nitrophenyl, 2-ethoxycarbonyl-4-nitrophenyl, 2,6-dicyano-4-nitrophenyl, 4-methoxycarbonylphenyl, 2-trifluoromethyl-4-nitrophenyl, 2,4-dicyanophenyl, 2-bromo-6-cyano-4-nitrophenyl, 4-nitro-2-sulfamoylphenyl, 2-nitro-4-(dimethyl)sulfamoylphenyl, 4-cyanophenyl, 4-methylsulfonylphenyl, 4-trifluoromethylphenyl, 4-chlorophenyl, 4-ethylsulfamoylphenyl, 4-acetylphenyl, 4-ethylcarbamoylphenyl, 2-carbamoyl-4-nitrophenyl, 2-methylsulfonyl-4-thiocyanophenyl, 2,6-dichloro-4-nitrophenyl, 2-nitro-4-thiocyanatophenyl, 2-chloro-6-cyano-4-nitrophenyl, 2-cyano-4-nitrophenyl, 2-chloro-4-cyanophenyl, 2-chloro-4-ethoxycarbonylphenyl. Examples of the arylazophenyl radicals represented by R are 4-phenylazophenyl, 4-(4'-methylphenylazo)phenyl, 4-(2',5'-dimethylphenylazo)-3-methylphenyl, 4-(4'-acetamidophenylazo)-2,5-dimethoxyphenyl, 4-(3-benzamidophenylazo)-3-chlorophenyl, etc. Preferably, the phenyl diazo component of the monoazo compounds contains not more than three substituents at the para and ortho positions.

Typical heterocyclic groups represented by R include 2-thiazolyl, 5-nitro-2-thiazolyl, 5-bromo-2-thiazolyl, 5-thiocyanato-2-thiazolyl, 4-trifluoromethyl-2-thiazolyl, 4-ethoxycarbonyl-2-thiazolyl, 5-cyano-2-thiazolyl, 5-acetamido-2-thiazolyl, 4-methylsulfonyl-2-thiazolyl 4-methyl-5-nitro-2-thiazolyl, 2-benzothiazlyl, 6-methylsulfonyl-2-benzothiazolyl, 6-ethoxycarbonyl-2-benzothiazolyl, 6-cyano-2-benzothiazolyl, 6-sulfamoyl-2-benzothiazolyl, 6-thiocyanato-2-benzothiazolyl, 6-N,N-dimethylsulfamoyl-2-benzothiazolyl, 4,6-dichloro-2-benzothiazolyl, 4-methyl-6-nitro-2-benzothiazolyl, 5-benzoyl-3-nitro-2-thienyl, 3-nitro-5-p-toluoyl-2-thienyl, 3,5-di(methylsulfonyl)-2-thienyl, 5-methylsulfonyl-3-nitro-2-thienyl, 5-ethylsulfamoyl-3-nitro-2-thienyl, 5-ethoxycarbonyl-2-thienyl, 3,5-dinitro-2-thienyl; 3-nitro-2-thienyl, etc.

A preferred group of the diazo components represented by R have the formula

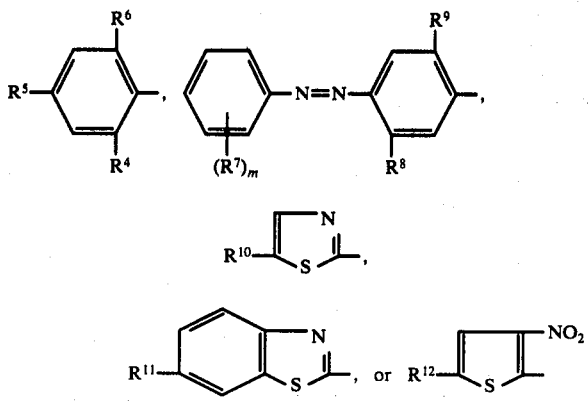

wherein

R[4] is hydrogen, halogen, cyano, formyl, lower alkanoyl, benzoyl, lower alkoxycarbonyl, lower alkylsulfonyl, sulfamoyl, lower alkylsulfamoyl, carbamoyl, lower alkylcarbamoyl, or trifluoromethyl;

R[5] is halogen, cyano, lower alkylsulfonyl, formyl, lower alkanoyl, benzoyl, lower alkoxycarbonyl, sulfamoyl, lower alkylsulfamoyl, carbamoyl, lower alkylcarbamoyl, trifluoromethyl, or nitro.

R[6] is hydrogen, halogen, cyano or nitro;

R[7], R[8] and R[9] are the same or different and each is hydrogen, lower alkyl, lower alkoxy, or halogen and $m$ is 1 or 2;

R[10] is lower alkyl, lower alkoxy, nitro, halogen, lower alkylsulfonyl, carbamoyl, lower alkylcarbamoyl, lower alkoxycarbonyl, sulfamoyl, lower alkylsulfamoyl, cyano, thiocyanato, trifluoromethyl, phenyl or substituted phenyl;

R[11] is lower alkyl, lower alkoxy, nitro, halogen, lower alkylsulfonyl, substituted lower alkylsulfonyl, carbamoyl, lower alkylcarbamoyl, lower alkoxycarbonyl, sulfamoyl, lower alkylsulfamoyl, cyano, thiocyanato, lower alkylthio, cyclohexylthio, phenylthio, substituted phenylthio, or trifluoromethyl; and R[12] is lower alkanoyl, benzoyl, or substituted benzoyl.

The acyl groups represented by A can be formyl, lower alkanoyl, aroyl, cyclohexylcarbonyl, lower alkoxycarbonyl, aryloxycarbonyl, lower alkylsulfonyl, arylsulfonyl, carbamoyl, lower alkylcarbamoyl, arylcarbamoyl, furoyl, etc. The alkanoyl, alkoxycarbonyl, and alkylsulfonyl groups can be substituted as described above in the definition of R. Acetyl, propionyl, butyryl, cyanoacetyl, chloroacetyl, phenylacetyl, methoxyacetyl, methylthioacetyl, methylsulfonylacetyl, methoxycarbonyl, propoxycarbonyl, butoxycarbonyl, methylsulfonyl, ethylsulfonyl, propylsulfonyl, butylsulfonyl, 2-cyanoethylsulfonyl, 2-methoxyethylsulfonyl, and 2-chloroethylsulfonyl, are examples of the alkanoyl, alkoxycarbonyl, and alkylsulfonyl groups which A can represent. The aryl group of the aroyl, aryloxycarbonyl, arylsulfonyl, and arylcarbamoyl group is preferably monocyclic, carbocyclic aryl such as unsubstituted phenyl and phenyl substituted with, for example, lower alkyl, lower alkoxy, halogen, etc. Tolyl, anisyl, p-bromophenyl, and o,p-dichlorophenyl are typical of such aryl groups. Dimethylcarbamoyl, ethylcarbamoyl, propylcarbamoyl, and butylcarbamoyl are illustrative alkylcarbamoyl groups which A can represent.

Examples of the alkyl and alkoxy groups which R[1] can represent and the alkyl groups represented by R[3] are described in the preceding examples of the substituents which can be present on the diazo components represented by R.

The alkyl radicals represented by R[2] can be unsubstituted or substituted, straight- or branch-chain lower alkyl. Representative examples of such alkyl radicals include methyl, ethyl, propyl, isopropyl, butyl, isobutyl, etc. and lower alkyl substituted, for example, with lower alkoxy, e.g. 2-methoxyethyl; cyano, e.g. 2-cyanoethyl; lower alkanoyloxy, e.g. acetoxyethyl; cyclohexyl, e.g. 2-cyclohexylethyl; etc. Preferably, one of R[1] and R[2] is lower alkyl and the other is hydrogen.

A group of the novel azo compounds which, because of their economy, and especially, their dyeability and fastness properties, are particularly valuable polyester dyes are those of formula (I) wherein R is a group having the formula

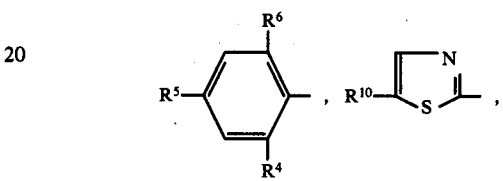

wherein

R[4] is hydrogen, chlorine, bromine, cyano, lower alkanoyl, lower alkoxycarbonyl, lower alkylsulfonyl, or trifluoromethyl;

R[5] is nitro, lower alkylsulfonyl, or thiocyanato;

R[6] is hydrogen, cyano, or nitro;

R[10] is cyano, nitro, lower alkylsulfonyl, or lower alkoxycarbonyl;

R[11] is cyano, nitro, lower alkylsulfonyl, cyanoethylsulfonyl, lower alkoxycarbonyl, or thiocyanato;

R[12] is lower alkanoyl; benzoyl, lower alkylbenzoyl, lower alkoxybenzoyl, halobenzoyl, or nitrobenzoyl;

A is lower alkanoyl, benzoyl, lower alkoxycarbonyl, lower alkylsulfonyl, or lower alkylcarbamoyl;

R[1], when R is a phenyl radical, is hydrogen, methyl, methoxy, or ethoxy, or when R is a heterocyclic radical, R[1] is hydrogen or methyl;

R[2] is hydrogen or lower alkyl, one of R[1] and R[2] being lower alkyl;

R[3] is methyl; and $n$ is 0 or 1.

The novel compounds of the invention are prepared by diazotizing an amine having the formula R—NH$_2$ and coupling the diazonium salt with a compound having the formula (II)

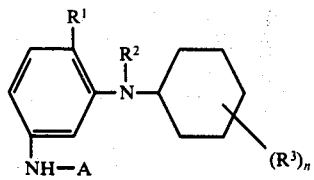

according to known procedures. The couplers of formula (II) are prepared by procedures analagous to published techniques. For example, a 3-nitroacylanilide or a 3-aminoacylanilide can be reacted with a cyclohexanone in the presence of hydrogen and a hydrogenation catalyst at elevated temperatures and pressures to obtain the corresponding 3-(cyclohexylamino)-acylanilide. The 3-(N-alkyl-N-cycloalkyl)acylanilide couplers can be obtained by treating the cyclohexylamino compound with an alkylating agent such as a dialkyl sulfate or an alkyl halide, an activated vinyl compound such as acrylonitrile, or with an epoxide such as ethylene oxide.

The preparation of the couplers and the novel azo compounds is further illustrated by the following examples.

EXAMPLE 1

A mixture of 3-aminoacetanilide (45.0 g.), cyclohexanone (74.0 g.) ethanol (100 ml.) 5% platinum on carbon (2.0 g.), and glacial acetic acid (2 drops) is hydrogenated in an autoclave at 165° C. and 1000 psi until the hydrogen uptake ceases. The catalyst is removed from the reaction mixture by filtration, ethanol evaporated off, and the product recrystallized from 600 ml. ethanol and 300 ml. water. The product, 3-(cyclohexylamino)acetanilide, melts at 124 to 125.5° C.

Analysis: Calcd. for $C_{14}H_{20}N_2O$: C, 72.4; H, 8.7; N, 12.1. Found: C, 72.2; H, 8.8; N, 12.1.

EXAMPLE 2

3-(Cyclohexylamino)acetanilide (11.7 g.), triethyl phosphate (15 ml.), and bromoethane (5.4 g.) are reacted on a steam bath for 6.0 hr. An additional 5.4 g. of bromoethane is added and the reaction is heated 4.0 hr. longer. The reaction mixture is drowned in water and ice. After the mixture is basified by the addition of NH₄OH, the aqueous portion is removed by decantation. The product, 3-(N-cyclohexyl-N-ethylamino)acetanilide, recrystallized from 200 ml. methanol plus 400 ml. water melts at 88° to 90° C.

Analysis: Calcd. for $C_{16}H_{24}N_2O$: C, 73.8; H, 9.3; N, 10.7. Found: C, 73.7; H, 9.3; N, 10.7.

EXAMPLE 3

A mixture of 3-(cyclohexylamino)acetanilide (6.96 g.), acrylonitrile (5.3 g.), cuprous chloride (0.5 g.), and acetic acid (10 ml.) is heated at 90° to 110° C. for 4.5 hr. The product is isolated by drowning in water and decanting off the aqueous layer to yield 3-(N,2-cyanoethyl-N-cyclohexyl)acetanilide. The product does not solidify readily but is pure enough to be used for preparing dyes.

EXAMPLE 4

A mixture of 3-amino-p-acetotoluidide (16.4 g.), cyclohexanone (24.7 g.), ethanol (50 ml.), acetic acid (2 drops), and 5% platinum on carbon catalyst (1.0 g.) is hydrogenated in an autoclave at 165° C. and 1000 psi until the hydrogen uptake ceases. The reaction mixture is filtered to remove the catalyst, and the ethanol is removed by evaporation. The 3-cyclohexylamino-p-acetotoluidide obtained melts at 118° to 119° C. after being recrystallized from water-ethanol.

EXAMPLE 5

3-Amino-p-acetoanisidide (90.0 g.) and cyclohexanone (122 g.) are reacted as described in Example 4 to yield 3-cyclohexylamino-p-acetoanisidide which, after being recrystallized from ethanol, melts at 135° to 137° C. This coupler has the structure:

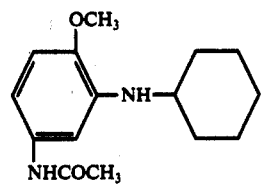

Additional couplers of formula (II) are obtained by substituting equivalent amounts of other acylamido(nitro)benzenes or acylamidoanilines in the procedures described in the preceding examples. Examples of the acylamidoanilines useful in preparing the couplers include 3-methylsulfonamido-aniline, 2-ethoxy-5-benzamidoaniline, 3-formamidoaniline, 5-ethylcarbamoylamino-2-methylaniline, and 3-p-tolylsulfonamidoaniline.

EXAMPLE 6

To 140 ml. of 70% $H_2SO_4$ is added 2-cyano-4,6-dinitroaniline (8.32 g.) at 15° C. The mixture is cooled and a solution of 3.0 g. NaNO₂ in 20 ml. conc. $H_2SO_4$ is added at −2 to 0° C. After 2.0 hr. at near 0° C., the diazotization mixture is added to a solution of 3-(N-cyclohexylamino)-p-acetoanisidide (10.5 g.) in 75 ml. of 1:5 acid (1 part pripionic:5 parts acetic acid) plus 150 ml 15% $H_2SO_4$ at below 10° C. After 20 min. at below 10° C., the coupling is diluted to 1500 ml. with water. The product is collected by filtration, washed with water, dried in air, and recrystallized from methanol. The azo compound obtained, 2-(2,4-dinitro-6-cyanophenylazo)-5-cyclohexylamino-p-acetoanisidide, produces bright, fast, turquoise shades on polyester fibers.

EXAMPLE 7

2-Cyano-4,6-dinitroaniline (2.08 g.) is diazotized and coupled with 3-(cyclohexylamino-p-acetotoluidide (2.46 g.) according to the procedure employed in Example 6. The azo compound obtained 2-(2,4-dinitro-6-cyanophenylazo)-5-cyclohexylamino-p-acetotoluidide, produces bright blue shades on polyester fabrics.

EXAMPLE 8

2-Cyano-4,6-dinitroaniline (2.08 g.) is diazotized and coupled with 3-(cyclohexylamino)acetanilide as described in Example 6. This compound, 2-(2,4-dinitro-6-cyanophenylazo)-5-(cyclohexylamino)acetanilide, produces heavy reddish blue shades on polyester fabrics and has excellent light-fastness and resistance to sublimation.

EXAMPLE 9

Sodium nitrite (0.72 g.) is added to 5 ml. of conc. $H_2SO_4$ with stirring. The solution is cooled and 1:5 acid (10 ml.) is added below 15° C. The mixture is cooled further and 2-chloro-4,6-dinitroaniline (2.18 g.) is added, followed by 1:5 acid (10 ml.), all at 0° to 5° C. After stirring at 0° to 5° C. for 2.0 hr., the diazotization solution is added to a solution of 3-(cyclohexylamino-p-acetoanisidide (2.62 g.) in 40 ml. 1:5 acid, with the temperature being kept below 10° C. The coupling, after 2.0 hr. at below 10° C., is drowned with water, and the product is collected by filtration, washed with water, and air dried. The product, 2-(2,4-dinitro-6-chlorophenylazo)-5-cyclohexylamino-p-acetoanisidide, has the formula

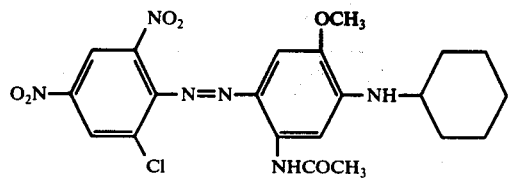

and produces fast, blue shades on polyester fibers.

EXAMPLE 10

2-Chloro-4-methylsulfonylaniline (2.06 g.) is diazotized and coupled with 3-(N-cyclohexyl-N-ethylamino)acetanilide (2.60 g.) in 40 ml. of 1:5 acid as described in Example 9, except that the coupling is buffered by the addition of ammonium acetate after the diazonium solution is added to the coupler. This azo compound, 2-(2-chloro-4-methylsulfonylphenylazo)-5-N-cyclohexyl-N-ethylamino)acetanilide, produces bright scarlet shades on polyester fibers.

EXAMPLE 11

2,4-bis(methylsulfonyl)aniline (2.49 g.) is diazotized and coupled with 3-(N-cyclohexyl-N-ethylamino)acetanilide (2.60 g.) as described in Example 9, except that the coupling is buffered by the addition of ammonium acetate. The product, 2-[2,4-bis(methylsulfonyl)phenylazo]-3-(N-cyclohexyl-N-ethyl)-acetanilide, imparts bright red shades on polyester fibers.

EXAMPLE 12 p-Nitroaniline (6.9 g.) is dissolved in 5.4 ml. conc. $H_2SO_4$ and 12.6 ml. water. This solution is poured on 50.0 g. of crushed ice, and then a solution of 3.6 g. $NaNO_2$ in 8.0 ml. water is added all at once. The diazotization is stirred at 0° to 5° C. for 1.0 hr., and then the solution is added to a chilled solution of 3-benzamido-N,2-acetoxyethyl-N-cyclohexylaniline (19.0 g.) dissolved in 250 ml. 1:5 acid. The coupling is kept at 0° to 5° C. and neutralized with ammonium acetate until it is neutral to Congo Red paper. After coupling for 2.0 hr., the mixture is drowned in water. The product is collected by filtration, washed with water and air dried. The resulting compound, 4-(4-nitrophenylazo)-3-benzamido-N,2-acetoxyethyl-N-cyclohexylaniline, gives bright fast, red dyeings on polyester fibers.

EXAMPLE 13

To 2.28 g. of 2-amino-6-methylsulfonyl-benzothiazole in 24.0 ml. of water is added 16.1 g. of conc. $H_2SO_4$. After all of the amine has dissolved, the solution is cooled and a solution of 0.84 g. of $NaNO_2$ in 5.0 ml. of conc. $H_2SO_4$ is added portionwide below 0° C. The diazotization is stirred at about 0° C. for 2.0 hr. and then the solution is added to a chilled solution of 3-(cyclohexylamino)-p-acetotoluidide (2.46 g.) in 40 ml. of 1:5 acid at about 5° C. After allowing to couple 1.0 hr., the azo compound is drowned in water, filtered, washed with water, and air dried. The product, 2-(6-methylsulfonyl-2-benzothiazolylazo)-5-cyclohexylamino-p-acetotoluidide, produces bright red shades on polyester fibers when applied thereto by the thermal fixation technique.

EXAMPLE 14

2-Amino-6-methylsulfonylbenzothiazole (2.28 g.) is diazotized and coupled with 2.60 g. of 3-(N-cyclohexyl-N-ethylamino)acetanilide as described in Example 13 to yield 2-(6-methylsulfonyl-2-benzothiazolylazo)-3-(N-cyclohexyl-N-ethylamino)acetanilide. This azo compound dyes polyester fiber bright bordeaux shades.

EXAMPLE 15

2-Amino-6-nitrobenzothiazole (5.85 g.) is added to 340 g. of 70% $H_2SO_4$ and the mixture cooled to 15° C. To this is added at 15° C. sodium nitrite (3.6 g.) and then the stirring is continued for 15 min. The solution is then cooled to 0° C. and 70.0 g. of ice is added. After stirring at 0° C. for 1.5 hr., the diazonium solution is added to a solution of 3-(N-cyclohexyl-N-ethylamino)acetanilide (7.80 g.) in 200 ml. of 15% $H_2SO_4$ at below 10° C. After 1.0 hr. at below 10° C., the coupling is drowned with water and the product is collected by filtration, washed with water, and air dried. The azo compound obtained imparts fast violet shades to polyester fibers and has the structure:

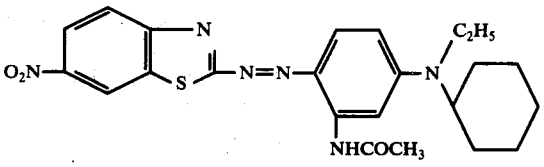

EXAMPLE 16

Sodium nitrite (0.76 g.) is added portionwise to 5 ml. of conc. $H_2SO_4$. This solution is cooled in an ice bath and 10 ml. 1:5 acid is added, keeping the temperature below 15° C. This mixture is stirred at 0° to 5° C. and 2.07 g. of 2-amino-6-thiocyanatobenzothiazole is added, followed by 10 ml. of 1:5 acid. The diazotization is stirred at 0° to 5° C. for 2.0 hr. and is then added to a solution of 2.82 g. 2-methyl-5-methylsulfonamido-N-cyclohexylaniline in a mixture of 50 ml. 15% $H_2SO_4$ and 50 ml. of 1:5 acid. The coupling is buffered with solid ammonium acetate and allowed to react at about 5° C. for 2.0 hr. After drowning in water, the product is collected by filtration, washed with water, and dried in air. This azo compound 4-(6-thiocyanato-2-benzothiazolylazo)-2-methyl-5-methylsulfonamido-N-cyclohexylaniline, gives fast red dyeings on polyester fibers.

EXAMPLE 17

2-Amino-5-nitrothiazole (4.4 g.) is dissolved in 37.0 ml. of water, plus 20.4 ml. of conc. $H_2SO_4$ at 25° C. A solution of 2.3 g. $NaNO_2$ in 15 ml. of conc. $H_2SO_4$ is added at −15° to 0° C. with stirring. After 15 min. at this temperature, the diazonium solution is added to a chilled solution of 3-(N-cyclohexyl-N-ethylamino)acetanilide (7.8 g.) in 200 ml. of 15% $H_2SO_4$ at less than 10° C. After 15 min., the coupling mixture is drowned with water, the dye collected by filtration, washed with water, and air dried. The product, 2-(5-nitro-2-thiazolylazo)-5-(N-cyclohexyl-N-ethylamino)acetanilide, produces bright blue shades on polyester fibers.

EXAMPLE 18

To 5 ml. of conc. $H_2SO_4$ is added portionwise 0.72 g. of $NaNO_2$ with stirring. The nitrosyl sulfuric acid solution is cooled and 10 ml. of 1:5 acid is added below 15°

C. To this is added 2.00 g. 2-amino-3-nitro-5-propionylthiophene followed by 10 ml. of 1:5 acid, all at 0 to 5° C. The reaction is stirred at 0° to 5° C. for 1.0 hr. The diazonium solution is added to a chilled solution of 2.76 g. of 5-ethoxycarbonylamino-2-methyl-N-cyclohexylaniline dissolved in 50 ml. of 1:5 acid. The coupling mixture is stirred occasionally for 1.0 hr., and it is then drowned with water. The product, 4-(3-nitro-5-propionyl-2-thienylazo)-3-ethoxycarbonylamino-2-methyl-N-cyclohexylaniline, is collected by filtration, washed with water, and air dried. It produces heavy blue shades on polyester fibers.

The azo compounds, which conform to formula (I), disclosed in the examples of the Table are prepared by the procedures described in the preceding examples. The color given in each example refers to dyeings of the azo compound on polyester textile materials.

TABLE

| Ex. No. | R | A | $R^1$ | $R^2$ | $(R^3)n$ | Color |
|---|---|---|---|---|---|---|
| 19 | 2-CN-4,6-di-$NO_2$-phenyl | —$COC_2H_5$ | —$CH_3$ | H | H | Blue |
| 20 | 2-CN-4,6-di-$NO_2$-phenyl | —$COCH_3$ | —$OCH_3$ | H | 3-$CH_3$ | Turquoise |
| 21 | 2-CN-4,6-di-$NO_2$-phenyl | —$COCH_3$ | —$OCH_3$ | H | 4-$CH_3$ | Turquoise |
| 22 | 2-CN-4,6-di-$NO_2$-phenyl | —$COCH_3$ | —$CH_3$ | H | 3,3,5-tri-$CH_3$ | Blue |
| 23 | 2-CN-4,6-di-$NO_2$-phenyl | —$COCH_3$ | H | H | 3,3,5-tri-$CH_3$ | Blue |
| 24 | 2-CN-4,6-di-$NO_2$-phenyl | —$COC_6H_5$ | —$CH_3$ | H | H | Blue |
| 25 | 2-CN-4,6-di-$NO_2$-phenyl | —$COCH_2Cl$ | —$CH_3$ | H | H | Blue |
| 26 | 2-CN-4,6-di-$NO_2$-phenyl | —$COOC_2H_5$ | —$CH_3$ | H | H | Blue |
| 27 | 2-CN-4,6-di-$NO_2$-phenyl | —$CONHC_2H_5$ | —$CH_3$ | H | H | Blue |
| 28 | 2-CN-4,6-di-$NO_2$-phenyl | —$SO_2CH_3$ | —$CH_3$ | H | H | Blue |
| 29 | 2-CN-4,6-di-$NO_2$-phenyl | —$COCH_3$ | H | —$CH_2CH(CH_3)_2$ | H | Blue |
| 30 | 2-CN-4,6-di-$NO_2$-phenyl | —$COCH_3$ | H | —$CH_2CH_2CH_3$ | H | Blue |
| 31 | 2-CN-4,6-di-$NO_2$-phenyl | —$COCH_2OCH_3$ | H | H | H | Blue |
| 32 | 2-CN-4,6-di-$NO_2$-phenyl | —$COCH_3$ | H | —$CH_2CH_2OCH_3$ | H | Blue |
| 33 | 2-CN-4,6-di-$NO_2$-phenyl | —$COCH_3$ | H | —$CH_2CH_2OOCCH_3$ | H | Blue |
| 34 | 2-CN-4,6-di-$NO_2$-phenyl | —$COC_6H_{11}$ | —$CH_3$ | H | H | Blue |
| 35 | 2-Cl-4,6-di-$NO_2$-phenyl | —$COC_6H_5$ | —$OCH_3$ | H | H | Blue |
| 36 | 2-Cl-4,6-di-$NO_2$-phenyl | —$COC_6H_5$ | —$OCH_3$ | —$C_2H_5$ | H | Blue |
| 37 | 2-Cl-4,6-di-$NO_2$-phenyl | —$COC_6H_5$ | —$CH_3$ | H | H | Violet |
| 38 | 2-Cl-4,6-di-$NO_2$-phenyl | —$COCH_3$ | —$CH_3$ | H | H | Violet |
| 39 | 2-Br-4,6-di-$NO_2$-phenyl | —$COCH_3$ | —$OCH_3$ | H | H | Blue |
| 40 | 2-Br-4,6-di-$NO_2$-phenyl | —$COC_6H_5$ | —$OCH_3$ | H | H | Blue |
| 41 | 2-Cl-6-CN-phenyl | —$COCH_3$ | —$OCH_3$ | H | H | Blue |
| 42 | 2,6-di-CN-4-$NO_2$-phenyl | —$COCH_3$ | —$OCH_3$ | H | H | Blue |
| 43 | 2-CN-4-$NO_2$-phenyl | —$COCH_3$ | —$CH_3$ | H | H | Violet |
| 44 | 2-CN-4-$NO_2$-phenyl | —$COCH_3$ | H | —$C_2H_5$ | H | Violet |
| 45 | 2-Cl-4-$NO_2$-phenyl | —$COCH_3$ | H | —$C_2H_5$ | H | Red |
| 46 | 2-Cl-4-$NO_2$-phenyl | —$COCH_3$ | —$CH_3$ | H | H | Red |
| 47 | 2-Cl-4-$NO_2$-phenyl | —$COC_6H_5$ | —$CH_3$ | H | H | Red |
| 48 | 2-Cl-4-$NO_2$-phenyl | —$COCH_3$ | H | —$CH_2CH_2CN$ | H | Red |
| 49 | 4-$NO_2$-phenyl | —$COCH_3$ | —$CH_3$ | —$CH_2CH_2CN$ | H | Red |
| 50 | 4-$NO_2$-phenyl | —$COCH_3$ | H | —$C_2H_5$ | H | Red |
| 51 | 4-$NO_2$-phenyl | —$COCH_3$ | H | —$CH_2CH_2CH_3$ | 3-$CH_3$ | Red |
| 52 | 2-Cl-4-$CH_3SO_2$-phenyl | —$COCH_3$ | H | —$CH_2CH_2CH_3$ | 3-$CH_3$ | Scarlet |
| 53 | 2-Cl-4-$CH_3SO_2$-phenyl | —$COCH_3$ | H | —$CH_2CH(CH_3)_2$ | H | Scarlet |
| 54 | 2-Cl-4-$CH_3SO_2$-phenyl | —$COOC_2H_5$ | H | —$C_2H_5$ | H | Scarlet |
| 55 | 2-Cl-4-$CH_3SO_2$-phenyl | —$COC_6H_5$ | H | —$C_2H_5$ | H | Scarlet |
| 56 | 2-Cl-4-$CH_3SO_2$-phenyl | —$COC_6H_4$-p-$OCH_3$ | H | —$C_2H_5$ | H | Scarlet |
| 57 | 2-Cl-4-$CH_3SO_2$-phenyl | —$COCH_3$ | H | H | H | Orange |
| 58 | 2-Cl-4-$CH_3SO_2$-phenyl | —$COCH_3$ | H | H | H | Orange |
| 59 | 2-Cl-4-$CH_3SO_2$-phenyl | —$COC_6H_5$ | —$CH_3$ | H | H | Orange |
| 60 | 2,4-di-$CH_3SO_2$-phenyl | —$COCH_3$ | —$CH_3$ | —$CH_2CH(CH_3)_2$ | H | Red |
| 61 | 2,4-di-$CH_3SO_2$-phenyl | —$COCH_3$ | H | —$C_2H_5$ | 4-$CH_3$ | Red |
| 62 | 2,4-di-$CH_3SO_2$-phenyl | —$COCH_3$ | H | H | H | Red |
| 63 | 2-$CH_3SO_2$-4-$NO_2$-phenyl | —$COCH_3$ | —$CH_3$ | H | H | Violet |
| 64 | 2-$CH_3SO_2$-4-$NO_2$-phenyl | —$COCH_3$ | —$CH_3$ | —$C_2H_5$ | H | Violet |
| 65 | 2-$CH_3SO_2$-4-$NO_2$-phenyl | —$COCH_3$ | H | —$CH_2C_6H_{11}$ | H | Violet |
| 66 | 2-$CH_3SO_2$-4-$NO_2$-phenyl | —$COCH_3$ | H | —$CH_2CH_2C_6H_{11}$ | H | Violet |
| 67 | 2,4-di-$NO_2$-phenyl | —$COCH_3$ | H | —$C_2H_5$ | H | Violet |
| 68 | 2,4-di-$NO_2$-phenyl | —$COCH_3$ | H | H | H | Violet |
| 69 | 2-CN-4-$CH_3SO_2$-phenyl | —$SO_2C_6H_4$-p-$OCH_3$ | —$CH_3$ | H | H | Red |
| 70 | 2,4-di-CN-phenyl | —$COCH_3$ | —$CH_3$ | —$C_2H_5$ | H | Red |
| 71 | 2-CN-4-Cl-phenyl | —$COCH_2SO_2CH_3$ | H | —$C_2H_5$ | H | Orange |
| 72 | 2-$CH_3SO_2$-phenyl | —$SO_2CH_2CH_2CN$ | H | —$C_2H_5$ | H | Orange |
| 73 | 4-$CH_3SO_2$-phenyl | —$COCH(CH_3)_2$ | H | —$C_2H_5$ | H | Orange |
| 74 | 2,6-di-Cl-4-$CH_3SO_2$-phenyl | —$COCH_3$ | H | H | H | Blue |
| 75 | 2-CN-phenyl | —$COCH_3$ | —$OCH_2$ | H | H | Orange |
| 76 | 2-$CH_3SO_2$-4-Cl-phenyl | —$COCH_3$ | —$CH_3$ | H | H | Orange |
| 77 | 2-$CH_3SO_2$-4-NCS-phenyl | —$COCH_3$ | —$CH_3$ | —$C_2H_5$ | H | Scarlet |
| 78 | 4-$C_6H_5$-N=N-phenyl | —$COCH_3$ | H | —$C_2H_5$ | H | Red |
| 79 | 2-Cl-4-$C_6H_5$-N=N-phenyl | —$COCH_3$ | H | —$C_2H_5$ | H | Red |
| 80 | 2—$C_2H_5NSO_2$-phenyl | —$COCH_3$ | H | —$C_2H_5$ | H | Red |
| 81 | 4,6-di-$NO_2$-phenyl | —$COCH_3$ | H | —$C_2H_5$ | H | Blue |
| 82 | 4,6-di-$NO_2$-phenyl | —$COCH_3$ | —$CH_3$ | H | H | Blue |
| 83 | 2-$C_2H_5NHSO_2$-phenyl | —$COCH_3$ | —$CH_3$ | H | H | Red |
| 84 | 4-$NO_2$-phenyl | —$COCH_3$ | —$CH_3$ | H | H | Red |
| 85 | 2-$C_2H_5OOC$-4-$NO_2$-phenyl | —$COCH_3$ | —$CH_3$ | H | H | Red |
| 86 | 2-$H_2NCO$-4-$NO_2$-phenyl | —$COCH_3$ | —$CH_3$ | H | H | Red |
| 87 | 6-$CH_3SO_2$-2-benzothiazolyl | —$COCH_3$ | H | —$CH_2CH(CH_3)_2$ | H | Red |
| 88 | 6-$CH_3SO_2$-2-benzothiazolyl | —$COCH_3$ | H | —$C_2H_5$ | 3-$CH_3$ | Red |
| 89 | 6-$CH_3SO_2$-2-benzothiazolyl | —$COCH_3$ | H | —$C_2H_5$ | 4-$CH_3$ | Red |
| 90 | 6-$CH_3SO_2$-2-benzothiazolyl | —$COCH_3$ | H | H | H | Red |
| 91 | 6-$CH_3SO_2$-2-benzothiazolyl | —$COOC_2H_5$ | —$CH_3$ | H | H | Red |
| 92 | 6-$CH_3SO_2$-2-benzothiazolyl | —$COCH(CH_3)_2$ | —$CH_3$ | H | H | Red |
| 93 | 6-$CH_3SO_2$-2-benzothiazolyl | —$COC_6H_5$ | —$CH_3$ | H | H | Red |
| 94 | 6-$CH_3SO_2$-2-benzothiazolyl | —$COCH_2Cl$ | —$CH_3$ | H | H | Red |
| 95 | 6-$CH_3SO_2$-2-benzothiazolyl | —$COCH_2OCH_3$ | —$CH_3$ | H | H | Red |

TABLE-continued

| Ex. No. | R | A | R¹ | R² | (R³)n | Color |
|---|---|---|---|---|---|---|
| 96 | 6-$CH_3SO_2$-2-benzothiazolyl | —$COC_6H_{11}$ | —$CH_3$ | H | H | Red |
| 97 | 6-$CH_3SO_2$-2-benzothiazolyl | —$COCH_3$ | —$CH_3$ | H | 3,3,5-tri-$CH_3$ | Red |
| 98 | 4-Br-6-$CH_3SO_2$-2-benzothiazolyl | —$COCH_3$ | H | —$C_2H_5$ | H | Violet |
| 99 | 6-$NO_2$-2-benzothiazolyl | —$COCH_3$ | H | H | H | Red |
| 100 | 6-$NO_2$-2-benzothiazolyl | —$COCH_3$ | —$CH_3$ | H | H | Red |
| 101 | 6-$NO_2$-2-benzothiazolyl | —$COCH_3$ | —$CH_3$ | H | 3-$CH_3$ | Violet |
| 102 | 6-$NO_2$-2-benzothiazolyl | —$COCH_3$ | —$CH_3$ | H | 4-$CH_3$ | Violet |
| 103 | 6-$NO_2$-2-benzothiazolyl | —$COCH_3$ | —$OCH_3$ | H | H | Blue |
| 104 | 6-$NO_2$-2-benzothiazolyl | —$COC_6H_5$ | —$CH_3$ | H | H | Violet |
| 105 | 6-$NO_2$-2-benzothiazolyl | —$COOC_2H_5$ | —$CH_3$ | H | H | Violet |
| 106 | 6-$NO_2$-2-benzothiazolyl | —$CONHC_2H_5$ | —$OC_2H_5$ | H | H | Blue |
| 107 | 6-CN-2-benzothiazolyl | —$COCH_3$ | —$CH_3$ | H | H | Blue |
| 108 | 6-CN-2-benzothiazolyl | —$COCH_3$ | H | —$C_2H_5$ | H | Red |
| 109 | 6-$C_2H_5OOC$-2-benzothiazolyl | —$COCH_3$ | H | —$C_2H_5$ | H | Red |
| 110 | 6-$H_2NCO$-2-benzothiazolyl | —$COCH_3$ | H | —$C_2H_5$ | H | Red |
| 111 | 4,6-di-$NO_2$-2-benzothiazolyl | —$COCH_3$ | H | —$C_2H_5$ | H | Red |
| 112 | 4,6-di-$NO_2$-2-benzothiazolyl | —$COCH_3$ | —$CH_3$ | H | H | Blue |
| 113 | 6-SCN-2-benzothiazolyl | —$COCH_3$ | —$CH_3$ | H | H | Blue |
| 114 | 6-SCN-2-benzothiazolyl | —$COCH_3$ | H | —$C_2H_5$ | H | Red |
| 115 | 6-Cl-2-benzothiazolyl | —$COCH_3$ | H | —$C_2H_5$ | H | Red |
| 116 | 4,6-di-Cl-2-benzothiazolyl | —$COCH_3$ | H | —$C_2H_5$ | H | Red |
| 117 | 6-$CH_3S$-2-benzothiazolyl | —$COCH_3$ | H | —$C_2H_5$ | H | Red |
| 118 | 6-$NCCH_2CH_2SO_2$-2-benzothiazolyl | —$COCH_3$ | H | —$C_2H_5$ | H | Red |
| 119 | 6-$C_6H_{11}SO_2$-2-benzothiazolyl | —$COCH_3$ | H | —$C_2H_5$ | H | Red |
| 120 | 6-$C_6H_5CH_2SO_2$-2-benzothiazolyl | —$COCH_3$ | H | —$C_2H_5$ | H | Red |
| 121 | 4-$OCH_3C_2H_5SO_2$-2-benzothiazolyl | —$COCH_3$ | H | —$C_2H_5$ | H | Red |
| 122 | 5-$NO_2$-2-thiazolyl | —$COCH_3$ | —$CH_3$ | H | H | Blue |
| 123 | 5-$NO_2$-2-thiazolyl | —$COCH_3$ | —$CH_3$ | H | 4-$CH_3$ | Blue |
| 124 | 5-$NO_2$-2-thiazolyl | —$COCH_3$ | —$CH_3$ | H | 3-$C_2H_5$ | Blue |
| 125 | 5-$NO_2$-2-thiazolyl | —$COC_2H_5$ | —$CH_3$ | H | 3,3,5-tri-$CH_3$ | Blue |
| 126 | 5-$NO_2$-2-thiazolyl | —$COCH(CH_3)_2$ | —$CH_3$ | H | H | Blue |
| 127 | 5-$NO_2$-2-thiazolyl | —$COOCH_3$ | —$CH_3$ | H | H | Blue |
| 128 | 5-$NO_2$-2-thiazolyl | —$COC_6H_5$ | —$CH_3$ | H | H | Blue |
| 129 | 5-$NO_2$-2-thiazolyl | —$COC_6H_5$ | —$CH_3$ | H | H | Blue |
| 130 | 5-$NO_2$-2-thiazolyl | —$COC_6H_5$ | H | —$C_2H_5$ | H | Blue |
| 131 | 5-$NO_2$-2-thiazolyl | —$COC_6H_5$ | H | —$CH_2CH(CH_3)_2$ | H | Blue |
| 132 | 5-$NO_2$-2-thiazolyl | —$CONHC_2H_5$ | H | H | H | Blue |
| 133 | 5-$NO_2$-2-thiazolyl | —$COCH_2OCH_3$ | H | —$C_2H_5$ | H | Blue |
| 134 | 5-$NO_2$-2-thiazolyl | —$COCH_2C_6H_5$ | H | —$C_2H_5$ | H | Blue |
| 135 | 5-$NO_2$-2-thiazolyl | —$COC_6H_{11}$ | H | —$C_2H_5$ | H | Blue |
| 136 | 5-$NO_2$-2-thiazolyl | —$CONHC_6H_5$ | H | —$C_2H_5$ | H | Blue |
| 137 | 5-$NO_2$-2-thiazolyl | —$CONHC_6H_5$ | —$CH_3$ | H | H | Blue |
| 138 | 5-$NO_2$-2-thiazolyl | —$COOC_6H_{11}$ | —$CH_3$ | H | H | Blue |
| 139 | 4-$CH_3$-5-$NO_2$-2-thiazolyl | —$COCH_3$ | —$CH_3$ | H | H | Blue |
| 140 | 4-$CF_3$-2-thiazolyl | —$COCH_3$ | —$CH_3$ | H | H | Blue |
| 141 | 5-$CH_3(CH_2)_5SO_2$-2-thiazolyl | —$COCH_3$ | —$CH_3$ | H | H | Red |
| 142 | 4-$C_6H_5$-2-thiazolyl | —$COCH_3$ | —$CH_3$ | H | H | Pink |
| 143 | 5-Br-2-thiazolyl | —$COCH_3$ | —$CH_3$ | H | H | Red |
| 144 | 5-CN-2-thiazolyl | —$COCH_3$ | —$CH_3$ | H | H | Red |
| 145 | 5-$CONH_2$-2-thiazolyl | —$COCH_3$ | —$CH_3$ | H | H | Violet |
| 146 | 5-SCN-2-thiazolyl | —$COCH_3$ | —$CH_3$ | H | H | Violet |
| 147 | 5-$COCH_3$-3-$NO_2$-2-thienyl | —$COC_2H_5$ | —$OC_2H_5$ | —$CH_3$ | H | Red |
| 148 | 5-$COCH_3$-3-$NO_2$-2-thienyl | —$COCH_3$ | —$OCH_3$ | H | H | Blue |
| 149 | 5-$COCH_3$-3-$NO_2$-2-thienyl | —$COCH_3$ | —$CH_3$ | H | 4-$CH_3$ | Turquoise |
| 150 | 5-$COCH_3$-3-$NO_2$-2-thienyl | —$COC_6H_5$ | H | —$C_2H_5$ | 4-$CH(CH_3)_2$ | Blue |
| 151 | 5-$COCH_3$-3-$NO_2$-2-thienyl | —$COCH_2OCH_3$ | H | —$CH(CH_3)_2$ | H | Blue |
| 152 | 5-$COC_2H_5$-3-$NO_2$-2-thienyl | —$COCH_3$ | —$OCH_3$ | H | H | Blue |
| 153 | 5-$COC_2H_5$-3-$NO_2$-2-thienyl | —$SO_2C_6H_4$-p-$OCH_3$ | H | —$C_2H_5$ | H | Turquoise |
| 154 | 5-$COCH(CH_3)_2$-3-$NO_2$-2-thienyl | —$COCH_3$ | H | —$C_2H_5$ | H | Blue |
| 155 | 5-$COCH(CH_3)_2$-3-$NO_2$-2-thienyl | —$COCH_3$ | —$OC_2H_5$ | —$CH_2CH_2OC_2H_5$ | H | Blue |
| 156 | 5-$COCH(CH_3)_2$-3-$NO_2$-2-thienyl | —$COCH_2SCH_3$ | H | —$C_2H_5$ | H | Blue |
| 157 | 5-$COCH(CH_3)_2$-3-$NO_2$-2-thienyl | —$COCF_3$ | —$CH_3$ | H | H | Blue |
| 158 | 5-$CO(CH_2)_2CH_3$-3-$NO_2$-2-thienyl | —$COCH_2CN$ | —$CH_3$ | H | H | Blue |
| 159 | 5-$CO(CH_2)_2CH_3$-3-$NO_2$-2-thienyl | —$CH_2CH_2OC_6H_5$ | —$CH_3$ | H | H | Blue |
| 160 | 3-$NO_2$-2-thienyl | —$COCH_3$ | —$CH_3$ | H | H | Blue |
| 161 | 3,5-di-$NO_2$-2-thienyl | —$COCH_3$ | H | —$C_2H_5$ | H | Blue-Green |
| 162 | 5-$C_2H_5OOC$-2-thienyl | —$COCH_3$ | H | —$C_2H_5$ | H | Blue |
| 163 | 5-$COOC_2H_5$-3-$NO_2$-2-thienyl | —$COCH_3$ | H | —$CH_3$ | H | Blue |
| 164 | 5-$COC_6H_5$-3-$NO_2$-2-thienyl | —$COCH_3$ | —$CH_3$ | H | H | Blue |
| 165 | 5-$COC_6H_4$-p-$CH_3$-3-$NO_2$-2-thienyl | —$COCH_3$ | —$CH_3$ | H | H | Blue |
| 166 | 5-$COC_6H_4$-m-$NO_2$-3-$NO_2$-2-thienyl | —$COC_6H_5$ | —$CH_3$ | H | H | Blue |
| 167 | 5-$SO_2CH_3$-3-$NO_2$-2-thienyl | —$COCH_3$ | —$CH_3$ | H | H | Blue |

The compounds of the invention can be applied to polyester by known disperse dyeing techniques employing carriers, surfactants, dispersing agents, etc. Dyeing can be conducted at atmospheric or super-atmospheric pressures. The following example illustrates a carrier dyeing procedure for applying the azo compounds of the invention to dye polyester textile materials.

EXAMPLE 168

An amount of 0.1 g. of the azo compound of Example 7 is dissolved in 10 cc. of 2-methoxyethanol. A small amount (3 to 5 cc) of a 3% sodium lignin sulfonate aqueous solution is added, with stirring, and then the volume of the bath is brought to 300 cc. with water. 3 cc. of an anionic solvent carrier (Tanavol) is added to the bath and 10.0 g. of a textile fabric made of poly(ethylene terephthalate) fibers is placed in the bath and worked 10 min. without heat. The dyeing is carried out at the boil for 1 hr. The dyed fabric is removed from the dyebath and scoured for 20 min. at 80° C. in a solution containing 1 g./l. neutral soap and 1 g./l. sodium carbonate. The fabric is then rinsed, dried in an oven at 250° F. and heat set (for the removal of residual carrier) for 5 min. at 350° F. The fabric is dyed a bright shade of blue and exhibits excellent fastness properties when tested according to conventional methods such as those described in the Technical Manual of the American Association of Textile Chemists and Colorists, 1968 edition.

The compounds of the invention can also be applied to polyester textile materials by the heat fixation technique described in U.S. Pat. No. 2,663,612 and in the American Dyestuff Reporter, 42, 1 (1953). The following procedure describes how the azo compounds of the invention can be applied to polyester materials by the heat fixation technique.

EXAMPLE 169

A mixture of 500 mg. of the compound of Example 24, 150 mg. of a sodium lignosulfonate dispersing agent (Marasperse N), 150 mg. of a partially desulfonated sodium lignosulfonate (Marasperse CB), 0.5 ml. glycerin, and 1.0 ml. of water is ground in a micro-size container (an accessory for a 1-quart size Szegvari Attritor) for approximately 3.5 hrs. Enough ⅛-inch stainless steel balls are added to provide maximum grinding. When the grinding is complete, the entire contents are poured into a beaker and 100 ml. of water are used to wash the remaining dye paste from the micro-container. The dye paste is then heated slowly to 65° C. with continuous stirring. A thickener and penetrating mixture is prepared by mixing 1 ml. of a complex diaryl sulfonate surfactant, (Compound 8-S), 3 ml. of a 3% solution of a sodium N-methyl-N-oleoyltaurate (Igepon T-S1), 8 ml. of a 25% solution of natural gums (Superclear 80N), and sufficient water to bring the volume to 100 ml. The thickener and penetrating mixture is added to the dye paste, the volume is adjusted to 200 ml. and the mixture is agitated for 15 min. The dye mixture is then filtered through cheesecloth to remove the stainless steel balls and added to the reservoir of a Butterworth padder where it is heated to about 45° to 60° C. 10 g. of a fabric of poly(ethylene terephthalate) fibers and 10 g. of a fabric of 65/35 spun poly(ethylene terephthalate)/cotton fibers are sewn together, end-to-end, and padded for 5 min. of continuous cycling through the dye mixture and between three rubber squeeze rollers of the padder. Dye mixture pick-up is about 60% based on the weight of the fabrics. The padded fabrics are dried at 200° F. and then heat-fixed for 2 min. at 415° F. in a forced air oven. The dyed fabrics are scoured for 20 min. at 65° to 70° C. in a solution containing 0.2% sodium hydrosulfite, 0.2% sodium carbonate and 1.7% of a 3% solution of sodium N-methyl-N-oleoyltaurate and then dried. The dye fabrics possess excellent brightness and fastness to light and sublimation.

The heat fixation dyeing procedure described above can be varied by the substitution of other dispersing agents, surfactants, suspending agents, thickeners, etc. The temperature and time of the heat-fixation step can also be varied.

Fibers having a basis of a linear terephthalate polyester and sold under the trademarks "Kodel", "Dacron", "Fortrel", "Vycron" and "Terylene" are illustrative of the linear aromatic polyester textile materials that can be dyed with the novel azo compounds. Polyesters prepared from ethylene glycol and dimethylterephthalate and cyclohexanedimethanol and dimethylterephthalate are examples of such linear aromatic polyesters. Polyesters prepared from cyclohexanedimethanol and dimethylterephthalate are more particularly described in U.S. Pat. No. 2,901,446. Poly(ethylene terephthalate) polyester fibers are described, for example, in U.S. Pat. No. 2,465,319. The polymeric linear polyester materials disclosed in U.S. Pat. Nos. 2,945,010; 2,957,745 and 2,989,363, for example, can be dyed. The linear aromatic polyester materials specifically named have a melting point of at least 0.35 and preferably, about 0.6. The inherent viscosity of the poly(1,4-cyclohexylenedimethylene terephthalate) polymer is also at least 0.35. These inherent viscosities are measured at 25° C. using 0.25 g. polymer per 100 ml. of a solvent consisting of 60% phenyl and 40% tetrachloroethane. The polyester fabrics, yarns, fibers and filaments that are dyed with the novel azo compounds can also contain minor amounts of other additives such as brighteners, pigments, delusterants, inhibitors, stabilizers, etc.

The invention has been described in detail with particular reference to preferred embodiments thereof, but it will be understood that variations and modifications can be effected within the spirit and scope of the invention.

We claim:

1. A water-insoluble azo compound having the formula

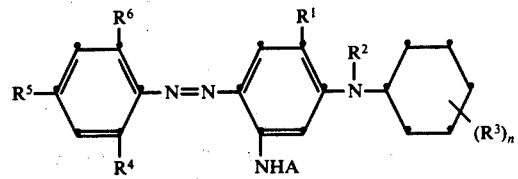

wherein

A is formyl; lower alkanoyl; lower alkanoyl substituted with chlorine, bromine, cyano, lower alkoxy, hydroxy, lower alkylsulfonyl, phenyl, lower alkylphenyl, lower alkoxyphenyl or halophenyl; benzoyl; benzoyl substituted with lower alkyl, lower alkoxy, chlorine or bromine; cyclohexylcarbonyl; lower alkoxycarbonyl; lower alkoxycarbonyl substituted with hydroxy or cyano;

$R^1$ is hydrogen, lower alkyl, or lower alkoxy;

$R^2$ is hydrogen, lower alkyl; or lower alkyl substituted with cyano, lower alkanoyloxy, or cyclohexyl;

$R^3$ is lower alkyl and n is 0, 1, 2 or 3;

$R^4$ is hydrogen, chlorine, bromine, cyano, lower alkanoyl, lower alkoxycarbonyl, lower alkylsulfonyl or trifluoromethyl;

$R^5$ is nitro, lower alkylsulfonyl, thiocyanato, or sulfamoyl; and $R^6$ is hydrogen, chlorine, bromine, formyl, lower alkanoyl, lower alkoxycarbonyl, trifluoromethyl, lower alkylsulfonyl, sulfamoyl, carbamoyl, cyano, or nitro.

2. A compound according to claim 1 wherein R is a group having the formula

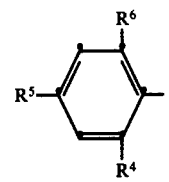

wherein $R^4$ is hydrogen, chlorine, bromine, cyano or nitro;

$R^5$ is nitro, lower alkylsulfonyl, thiocyanato, or sulfamoyl; and $R^6$ is hydrogen, chlorine, bromine, formyl, lower alkanoyl, lower alkoxycarbonyl, trifluoromethyl, lower alkylsulfonyl, cyano, sulfamoyl, or carbamoyl.

3. A compound according to claim 1 having the formula

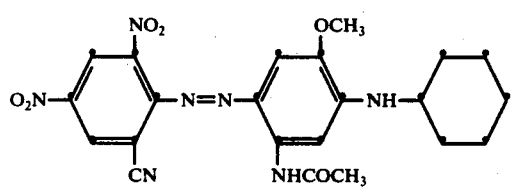

4. A compound according to claim 1 having the formula

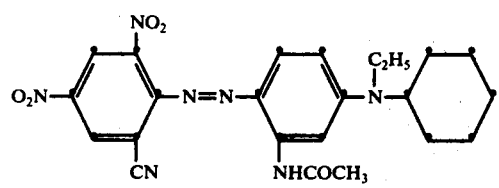

5. A compound according to claim 1 having the formula

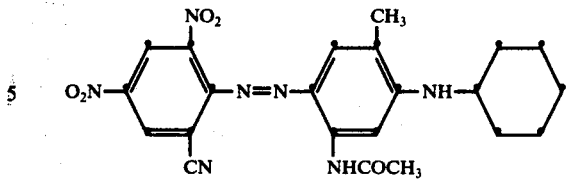

6. A compound according to claim 1 having the formula

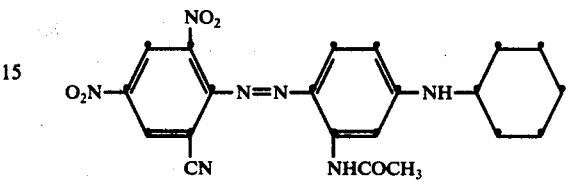

7. A compound according to claim 1 having the formula

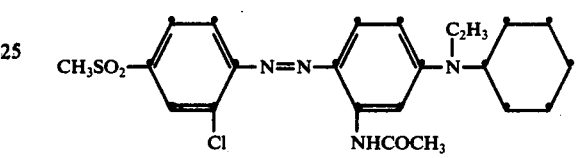

8. A compound according to claim 1 having the formula

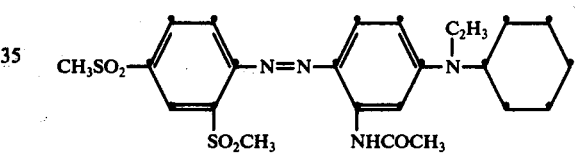

* * * * *

UNITED STATES PATENT OFFICE
CERTIFICATE OF CORRECTION

Patent No. 4,049,643             Dated September 20, 1977

Inventor(s) Max A. Weaver et al.

It is certified that error appears in the above-identified patent and that said Letters Patent are hereby corrected as shown below:

Column 2, line 56, "2-benzothiazlyl" should read ---2-benzothiazolyl---.

Column 9, in the Table under Column "R", in Example 35, "2-CL-4,6-di-$NO_2$-phenyl" should read ---2-Cl-4,6-di-$NO_2$-phenyl---.

Column 10, in the Table under Column "$R^1$" in Example 75, "-$OCH_2$" should read --- -$OCH_3$---.

Column 11, in the Table under Column "R" in Example 141, "5-$CH_3(CH_2)_5SO_2$-2-thiazolyl" should read ---5-$CH_3(CH_2)_3SO_2$-2-thiazolyl---.

Column 13, line 52, "dye" should read ---dyed---.

UNITED STATES PATENT OFFICE
CERTIFICATE OF CORRECTION

Patent No. 4,049,643      Dated September 20, 1977

Inventor(s) Max A. Weaver et al.

It is certified that error appears in the above-identified patent and that said Letters Patent are hereby corrected as shown below:

Column 16, line 25, the formula of Claim 7 should read

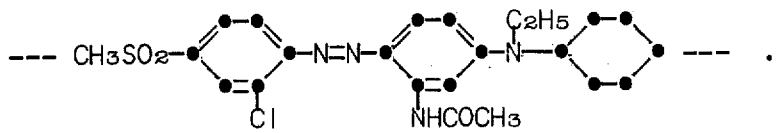

Column 16, line 35, the formula of Claim 8 should read

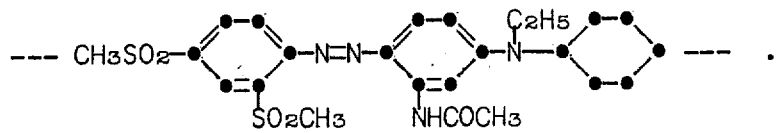

Signed and Sealed this

Twenty-third Day of May 1978

[SEAL]

Attest:

RUTH C. MASON
Attesting Officer

LUTRELLE F. PARKER
Acting Commissioner of Patents and Trademarks